United States Patent
Lach et al.

(10) Patent No.: US 11,293,621 B2
(45) Date of Patent: Apr. 5, 2022

(54) LIGHT GUIDE FOR LAMPS AND RELATED LAMP FOR MOTOR VEHICLES

(71) Applicant: OLSA S.p.A., Rivoli-Cascine Vica To (IT)

(72) Inventors: Fabio Lach, Rivoli-Cascine Vica To (IT); Alessandro Romanelli, Rivoli-Cascine Vica To (IT); Antonio Poianella, Rivoli-Cascine Vica To (IT); Frank Hallitschke, Rivoli-Cascine Vica To (IT)

(73) Assignee: OLSA S.p.A., Rivoli TO (IT)

( * ) Notice: Subject to any disclaimer, the term of this patent is extended or adjusted under 35 U.S.C. 154(b) by 0 days.

(21) Appl. No.: 17/125,498

(22) Filed: Dec. 17, 2020

(65) Prior Publication Data
US 2021/0190287 A1 Jun. 24, 2021

(30) Foreign Application Priority Data

Dec. 20, 2019 (IT) .......................... 102019000024919
Dec. 20, 2019 (IT) .......................... 202019000004699

(51) Int. Cl.
*F21S 43/245* (2018.01)
*F21S 43/239* (2018.01)
(Continued)

(52) U.S. Cl.
CPC ........... *F21S 43/245* (2018.01); *F21S 43/239* (2018.01); *F21S 43/249* (2018.01); *G02B 6/009* (2013.01);
(Continued)

(58) Field of Classification Search
CPC ...... F21S 43/245; F21S 43/249; F21S 43/239; G02B 6/0023; G02B 6/005; G02B 6/0065;
(Continued)

(56) References Cited

U.S. PATENT DOCUMENTS

2014/0146554 A1\* 5/2014 Giraud ..................... F21S 43/14
362/511
2017/0205042 A1\* 7/2017 Kim ..................... B60Q 1/0011
(Continued)

FOREIGN PATENT DOCUMENTS

EP 3009301 A1 \* 4/2016 ............ F21S 43/145
JP 2015162363 A 9/2015
(Continued)

*Primary Examiner* — Anabel Ton
(74) *Attorney, Agent, or Firm* — Dickinson Wright PLLC

(57) ABSTRACT

A lamp assembly for a motor vehicle comprises a light source and a light guide, which includes a diffuser body having a diffuser inlet and a light emission portion. The diffuser body is configured to conduct light rays from the diffuser inlet to the light emission portion, so as to be visible to an observer. The light guide also includes an extension with a light collector configured to collect rays emitted by the light source, a coupling portion, and a guide body configured to conduct light rays between the light collector and the coupling portion. The coupling portion is optically coupled to the light inlet portion of the diffuser body for transmitting the light rays from the extension into the diffuser body. The diffuser body is made of a material with high light diffusion properties and the extension is made of material with relatively poor light diffusion properties.

22 Claims, 5 Drawing Sheets

(51) Int. Cl.
*F21S 43/249* (2018.01)
*F21V 8/00* (2006.01)
*F21W 103/35* (2018.01)
*F21W 103/20* (2018.01)

(52) U.S. Cl.
CPC ......... *G02B 6/0023* (2013.01); *G02B 6/0055* (2013.01); *G02B 6/0065* (2013.01); *G02B 6/0075* (2013.01); *F21W 2103/20* (2018.01); *F21W 2103/35* (2018.01)

(58) Field of Classification Search
CPC .. G02B 6/0075; G02B 6/009; F21W 2103/35; F21W 2103/20
See application file for complete search history.

(56) References Cited

U.S. PATENT DOCUMENTS

| | | |
|---|---|---|
| 2017/0261168 A1 | 9/2017 | Edletzberger et al. |
| 2019/0170317 A1 | 6/2019 | Gloss et al. |

FOREIGN PATENT DOCUMENTS

| | | | |
|---|---|---|---|
| WO | 2014199108 A1 | 12/2014 | |
| WO | 2015071620 A1 | 5/2015 | |
| WO | WO-2021005330 A1 * | 1/2021 | ............ F21S 43/315 |

* cited by examiner

LIGHT GUIDE FOR LAMPS AND RELATED LAMP FOR MOTOR VEHICLES

CROSS-REFERENCE TO RELATED APPLICATIONS

This application claims the benefit of Italian Patent Application Serial No. IT 202019000004699, filed Dec. 20, 2019, and Italian Patent Application Serial No. IT 102019000024919, filed Dec. 20, 2019, which are each incorporated herein by reference in their entirety.

FIELD

The present disclosure relates generally to a light guide for lamps, and particularly a light guide which can emit light from an extended surface in a uniform manner. The present invention further relates to a lamp assembly for motor vehicles, such as a rear lamp, that includes such a light guide.

BACKGROUND

This section provides background information related to vehicle closure panels and carrier assemblies therefor to provide a better understanding of currently available configurations and adaptations of such light guides and lamp assemblies for motor vehicles. However, the information provided in this section is not necessarily considered to be prior art with respect to the inventive concepts associated with the present disclosure.

In the automotive field, a lamp may be configured with an evenly illuminated surface from which light rays are emitted. Some existing solutions include lighting devices, e.g. OLED devices, which permit the generation of light emission surfaces, even large ones, wherein the light emitted from such a surface is uniform. Such a solution offers high performance, but can be very expensive and may present difficulty being used in a motor vehicle lamp assembly.

Light guides are known which can, due to the principle of total internal reflection, evenly illuminate a surface by using a small number of LEDs, e.g. only one LED. Materials are also known that can diffract the light running through them, so that they can be illuminated in a substantially uniform manner regardless of the shape of the object and of the number of light sources. Because of their high diffracting properties, however, such materials typically have a very low efficiency. Furthermore, large light emission surfaces located beyond a certain distance from the light sources generally result in non-uniform light emission.

In the automotive field there is an increasing demand for innovative, low-cost solutions for implementing functions in automobile lamps having shapes also dictated by stylistic and aesthetic requirements, which are often in contrast with the technical specifications necessary for creating such elements.

SUMMARY

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

It is an objective of the present disclosure to provide a light guide for a motor vehicle lamp assembly. The light guide comprises a diffuser body made of a material with a first light diffusion property and which includes a diffuser inlet and a light emission portion. The diffuser body is configured to conduct light rays by total internal reflection from the diffuser inlet to exit the diffuser body at the light emission portion so as to be visible to an observer. The light guide also comprises an extension that includes a light collector configured to collect rays emitted by at least one light source, a coupling portion, and a guide body extending between the light collector and the coupling portion. The extension is made of material having a second light diffusion property that is substantially lower than the first light diffusion property of the diffuser body, and the extension is configured to conduct the light rays therethrough from the light collector to the coupling portion by total internal reflection. The coupling portion is optically coupled to the diffuser inlet of the diffuser body for transmitting the light rays from the extension into the diffuser body.

It is another objective of the present disclosure to provide a lamp assembly for a motor vehicle. The lamp assembly comprises a supporting structure holding one or more light sources, and a light guide. The light guide includes a diffuser body made of a material with a first light diffusion property and which includes a diffuser inlet and a light emission portion. The diffuser body is configured to conduct light rays by total internal reflection from the diffuser inlet to exit the diffuser body at the light emission portion so as to be visible to an observer. The light guide also includes an extension having a light collector configured to collect rays emitted by the one or more light sources, a coupling portion, and a guide body extending between the light collector and the coupling portion. The extension is made of material having a second light diffusion property that is substantially lower than the first light diffusion property of the diffuser body, and the extension is configured to conduct the light rays therethrough from the light collector to the coupling portion by total internal reflection. The coupling portion is optically coupled to the light inlet portion of the diffuser body for transmitting the light rays from the extension into the diffuser body.

Further areas of applicability will become apparent from the description provided herein. As noted, the description and any specific examples in this summary are intended for purposes of illustration only and are not intended to limit the scope of the present disclosure.

BRIEF DESCRIPTION OF THE DRAWINGS

Other advantages of the present embodiments will be readily appreciated, as the same becomes better understood by reference to the following detailed description and appended claims when considered in connection with the accompanying drawings, wherein:

DETAILED DESCRIPTION OF EXAMPLE EMBODIMENTS

Figure 1:
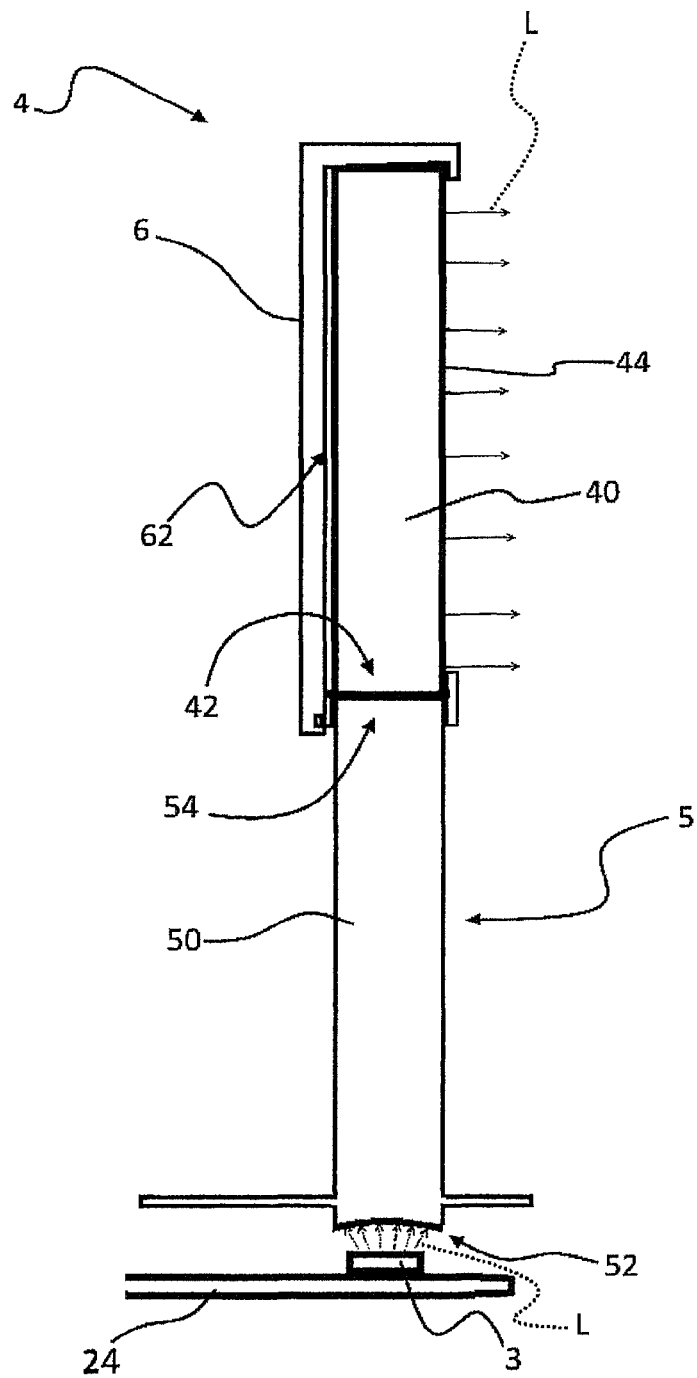
FIG. 1 shows a sectional view, relative to a lateral vertical plane, of a light guide according to the present disclosure.

The example embodiments will now be described more fully with reference to the accompanying drawings.

One or more example embodiments of a light guide and a lamp assembly for a motor vehicle are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure provides a light guide for a motor vehicle lamp assembly that makes it possible to obtain a light emission surface that is uniformly illuminated even when the light emission surface is distant from the light source. Furthermore, the present provides a light guide for lamps that comprises a frame incorporating a reflecting portion.

The features and the advantages of the light guide and of the lamp will become clear and apparent from the following patent description, which will describe some example embodiments with reference to the annexed drawings, wherein: reference numeral 4 designates the light guide, as a whole; and reference numeral 2 designates the motor vehicle lamp assembly, as a whole. The light guide 4 according to the present disclosure is particularly suitable for use in the motor vehicle lamp assembly 2. However, the light guide 4 may also be used in other applications.

The light guide 4 according to the present disclosure comprises a diffuser body 40 adapted to conduct, at least partly, light rays "L" within itself by total internal reflection. The diffuser body 40 comprises in turn: at least one diffuser inlet 42. Through the diffuser inlet 42 the light rays "L", emitted by at least one light source 3, enter the diffuser body 40. The diffuser body 40 further comprises a light emission portion 44. From the light emission portion 44 the light rays "L", at least partly conducted in the diffuser body 40, exit the light guide 4 so as to be visible to an observer.

The diffuser body 40 is made of material with a first light diffusion property. The first light diffusion property may be a relatively high degree of light diffusion. For example, the diffuser body 40 may be made of plastic material with high light diffusion properties. In some embodiments, the diffuser body 40 is made of Poly(methyl methacrylate) (PMMA), also known as acrylic, or acrylic glass. By using a PMMA material with high light diffusion properties for making the diffuser body 40, it is possible to realize a light guide 4 wherein the light emission portion 44 can be illuminated in a uniform manner even when using a small number of light sources, the area to be illuminated being equal.

The light guide 4 according to the present disclosure further comprises an extension 5 that is optically coupled to the diffuser body 40. The extension 5 includes: a guide body 50, adapted to conduct light rays "L" within itself, for example by total internal reflection; and at least one light collector 52. Through the light collector 52 the light rays "L", emitted by at least one light source 3, enter the extension 5, in particular the guide body 50.

The extension 5 further comprises a coupling portion 54. Through the coupling portion 54, the light rays "L", conducted in the extension 5, exit the extension 5 to enter the diffuser body 40 through an optical coupling with the at least one diffuser inlet 42 of the diffuser body 40.

The extension 5 is made of material with a second light diffusion property, which is substantially lower than the light diffusion property of the diffuser body 40, thereby allowing the light rays "L", entering through the light collector 52, to be conducted towards the coupling portion 54 by total internal reflection. The second light diffusion property or properties of the extension 5 may also be called "poor" light diffusion properties. The extension 5 may be made of plastic material, such as PMMA. By using a PMMA material with low light diffusion properties for making the extension 5, it is possible to realize a light guide 4 wherein the light emission portion 44 can be placed in a remote position relative to the light source 3. The poor light diffusion properties of the extension 5 may refer to a material having relatively high light transmission properties. The poor light diffusion properties may refer to a material that diffuses light to a substantially lesser degree than the material comprising the diffuser body 40, which has higher light diffusion properties. Likewise, the high light diffusion properties of the material comprising the diffuser body 40 may refer to a material that diffuses light to a substantially greater degree than the material comprising the extension 5.

In operation, the light rays "L", emitted by at least one light source 3, enter the extension 5 and are conducted within the extension 5 until they enter the diffuser body 40 of the light guide 4, to be then conducted therein and exit through the light emission portion 44. In some embodiments, there are no gaps, such as air breaks, between the coupling portion 54 of the extension 5 and the diffuser inlet 42 of the light guide 4.

For the purposes of the present description, optical coupling refers to surfaces arranged so as to define an optical discontinuity that optimizes light transmission while reducing light reflection.

The light guide 4 of the present disclosure permits moving the light emission portion 44 of the diffuser body 40 of the light guide 4 farther away from the light source 3 while preserving the illumination uniformity of the light emission portion 44, when compared to conventional designs. The light guide 4 of the present disclosure permits generating a low-cost light guide 4 emitting light in an area remote from the light source 3, while still ensuring high illumination uniformity.

In some embodiments, the diffuser body 40 and the extension 5, in particular the guide body 50 of the light guide 4, are formed in a single production process. For example, the diffuser body 40 and the guide body 50 may be formed together by injection molding. In some embodiments, the diffuser body 40 and the guide body 50 have a one-piece construction e.g. one piece defines both the diffuser body 40 of the light guide 4 and the guide body 50 of the extension 5. For the purposes of the present description, "one piece" means that the parts making up such piece cannot be separated without impairing their function.

In some embodiments, both the diffuser body 40 and the extension 5 are made of PMMA materials, although with different light diffusion properties.

Describing now more in detail the technical features of the light guide 4, the diffuser body 40 may include at least one other portion, other than the light emission portion 44, and which has technical characteristics, in terms of material and/or structure, configured for at least one of diffusing and/or reflecting the light rays "L" incident thereupon. In particular, the characteristics of the diffuser body 40 may be configured to direct as many light rays "L" as possible towards the light emission portion 44. In some embodiments, the diffuser body 40 may be shaped so as to maximize the conveyance of the light rays "L" towards the light emission portion 44. The use of PMMA materials with high light diffraction properties may make the structural conformation, e.g. the profile, of the diffuser body 40 more independent, for maximizing the amount of the light emitted from the light emission portion 44.

In general, the light emission portion 44 defines at least one surface, such as a face of the diffuser body 40.

In some embodiments, the light guide 4 includes a reflecting portion 62. The reflecting portion 62 may be coupled to a face of the diffuser body 40 opposite to the light emission portion 44. Such reflecting portion 62 is adapted to reflect the light rays "L" incident thereon, directing them towards the light emission portion 44. The reflecting portion 62 may increase the light rays "L" that exit the light emission portion 44 of the diffuser body 40 and reduce losses, in particular losses which are due to the light directed towards other faces of the diffuser body 40.

In some embodiments, one face of the diffuser body 40 defines the light emission portion 44, such face being the one with the largest area. The face opposite to the light emission portion 44 is the face whereto the reflecting portion 62 is coupled. In general, also the face whereto the reflecting portion 62 is coupled has a large area, e.g. substantially equal to that of the light emission portion 44. More in general, the configuration, such as dimensions and the number of faces, of the diffuser body 40 may vary depending on the design of the light guide 4.

In some embodiments according to the present disclosure, the light guide 4 includes a frame 6. The frame 6 may be adapted to surround the diffuser body 40 of the light guide 4, leaving in view only at least a part of the light emission portion 44. In other words, the frame may cover all of the diffuser body 40 except for all or part of the light emission portion 44. The frame 6 may be, for example, shaped so as to define a light emission area that is smaller than the total area defined by the light emission portion 44.

In some embodiments, the frame 6 comprises a reflecting portion 62, facing towards a face of the diffuser body 40 opposite to the light emission portion 44. Such reflecting portion 62 is adapted to reflect the light rays "L" directed towards other portions of the diffuser body 40, reflecting them towards the light emission portion 44.

In some embodiments, the frame 6 is designed so as to include the reflecting portion 62 of the light guide 4. In this way it is possible to reduce the number of steps necessary for assembling the light guide 4, because the reflecting portion 62 does not need to be individually coupled to the diffuser body 40, e.g. by fastening it to the diffuser body 40, but will be coupled to the diffuser body 40 by means of the frame 6.

More specifically, in some embodiments, the reflecting portion 62 may be made integrally with the frame 6. Preferably, the frame 6 and the reflecting portion 62 are made in a single production process of injection moulding. The present embodiment makes it possible to make the frame 6 as one piece, e.g. one piece defining both the frame 6 and the reflecting portion 62. Such an embodiment is particularly advantageous when both the frame 6 and the reflecting portion 62 are made for instance of Polycarbonate (PC) materials, although with different light reflection properties.

In one possible, though illustrative and non-limiting, embodiment, the frame 6 substantially defines a hollow area having an aperture 60, through which the diffuser body 40 of the light guide 4 can be inserted into such hollow area of frame 6.

The frame 6 also defines a window 61 that is aligned with the light emission portion 44 of the diffuser body 40 of the light guide 4 when the frame 6 is assembled to the diffuser body 40, so as to leave in view only the light emission portion 44, or at least a portion thereof. In other words, the frame 6 may cover much of the light guide 4, leaving visible only all of, or at least a part of, the light emission portion 44 of the diffuser body 40. In some embodiments, the window 61 faces, or substantially faces, towards the reflecting portion 62 on two distinct faces of the frame 6.

The frame 6 may have an internal area with a volume at least equal to a volume defined by the diffuser body 40 of the light guide 4. However, the frame 6 may have a greater volume for facilitating the insertion of the diffuser body 40 into such area through the aperture 60. In some embodiments, the frame 6 is fitted onto the diffuser body 40 of the light guide 4. More specifically, the interior thickness of the frame 6 and the surface whereon such window 61 is formed may be equal to or greater than the thickness of the diffuser body 40, so as to facilitate fitting the frame 6 over the diffuser body 40.

In some embodiments, the frame 6 includes one or more releasable fasteners 64. The releasable fasteners 64 may be adapted to removably fasten the frame 6 to the body of the light guide 4, the latter including complementary fastening elements for interacting with the releasable fasteners 64. For example, the releasable fasteners 64 may be snap-action elements, adapted to fit into suitable holes formed in a portion of the body of the light guide 4, which define the fastening elements. In another example, the releasable fasteners 64 may be housings into which suitable protrusions formed in a portion of the body of the light guide 4, which define the fastening elements, can be snap-fitted, so as to prevent any mutual movement at least along one axis.

In some embodiments, the frame 6 is substantially opaque so as to block light rays "L" coming from the diffuser body 40 and from the outside. The color of the frame 6, in particular its external colour, may vary according to specific requirements, whether aesthetic or technical ones, e.g. according to technical specifications for accomplishing the functions for which such light guide 4 is to be implemented in a motor vehicle lamp assembly 2.

In some embodiments, the diffuser body 40 of the light guide 4 is at least partly transparent. In such an embodiment, the reflecting portion 62, which is visible when observing the diffuser body 40, may perform additional functions, e.g. aesthetic ones; in particular, it may provide a color shade that will be perceived by the user in addition to the color defined by the diffuser body 40 itself, or it may generate some special optical effects. The color of the diffuser body 40 may be dictated by the specifications of the function for which the light guide 4 is implemented in an automotive lamp assembly 2.

In some embodiments, the frame 6 is made of Polycarbonate (PC) material. The use of PC material for making the frame 6 makes it possible to realize a structure that is sufficiently strong to protect the light guide 4, in particular the diffuser body 40 thereof. In a preferred embodiment of the light guide 4, the reflecting portion 62 is made of PC material specifically designed to increase its light reflection properties, while still keeping the thickness of the reflecting portion 62 small, such that it can be incorporated into the frame 6.

Describing now more in detail the construction aspects of the light guide 4 according to the present disclosure, the light emission portion 44 defines an area or surface having dimensions which may be at least one order of magnitude greater (i.e. ten times larger) than the thickness of the diffuser body 40 of the light guide 4.

For the purposes of the present description, the thickness of the diffuser body 40 is a third dimension of the diffuser body 40, complementing length and width dimensions that define the light emission portion 44 of the diffuser body 40.

In some embodiments, the guide body 50 of the extension 5 has a thickness that is substantially equal to the thickness of the diffuser body 40 of the light guide 4. The remaining dimensions of the extension 5, e.g. the dimensions of the guide body 50, may be substantially equal to corresponding dimensions of the diffuser body 40 of the light guide 4, or possibly slightly smaller or greater, depending on the distance that the diffuser body 40 is to be spaced apart from the light source 3.

Describing now the construction details of some possible embodiments of the light guide 4, FIG. 1 shows a sectional view relative to a vertical lateral plane of a light guide 4 according to the present disclosure. FIG. 1 shows how the diffuser body 40 of the light guide 4 is coupled to the extension 5, in particular at the diffuser inlet 42 of the diffuser body 40 and at the coupling portion 54 of the extension 5. This figure shows how the light rays "L" emitted by the light source 3 enter the extension 5 through the light collector 52. The light collector 52 may, for example, have define a concave shape, as shown. However, the light collector 52 may have any other shape, which may be configured to receive the light source 30 therein.

The light rays "L" that have entered the guide body 50 of the extension 5 are conducted by total internal reflection along the extension 5 of the guide body 50 until they reach the coupling portion 54. By means of the optical coupling, the light rays "L" enter the diffuser body 40 of the light guide 4 through the diffuser inlet 42. The light rays "L" in the diffuser body 40 are diffused and directed towards the light emission portion 44, from which they exit the light guide 4 and become visible to an observer. In the illustrated embodiment, the light guide 4 includes a frame 6, which is adapted to suitably enclose the diffuser body 40 of the light guide 4, leaving open a surface of the light emission portion 44, from which the light rays "L" can exit.

As illustrated in FIG. 1, the frame 6 incorporates into its structure the reflecting portion 62, e.g. as a layer of reflecting material. In the illustrated embodiment, the light source 3 is mechanically and electronically connected to a printed circuit board (PCB). The light source may include one or more light-emitting diodes (LEDs), which may be multi-color red-green-blue (RGB) devices, optionally with an LED configured to emit white light.

Figure 2:
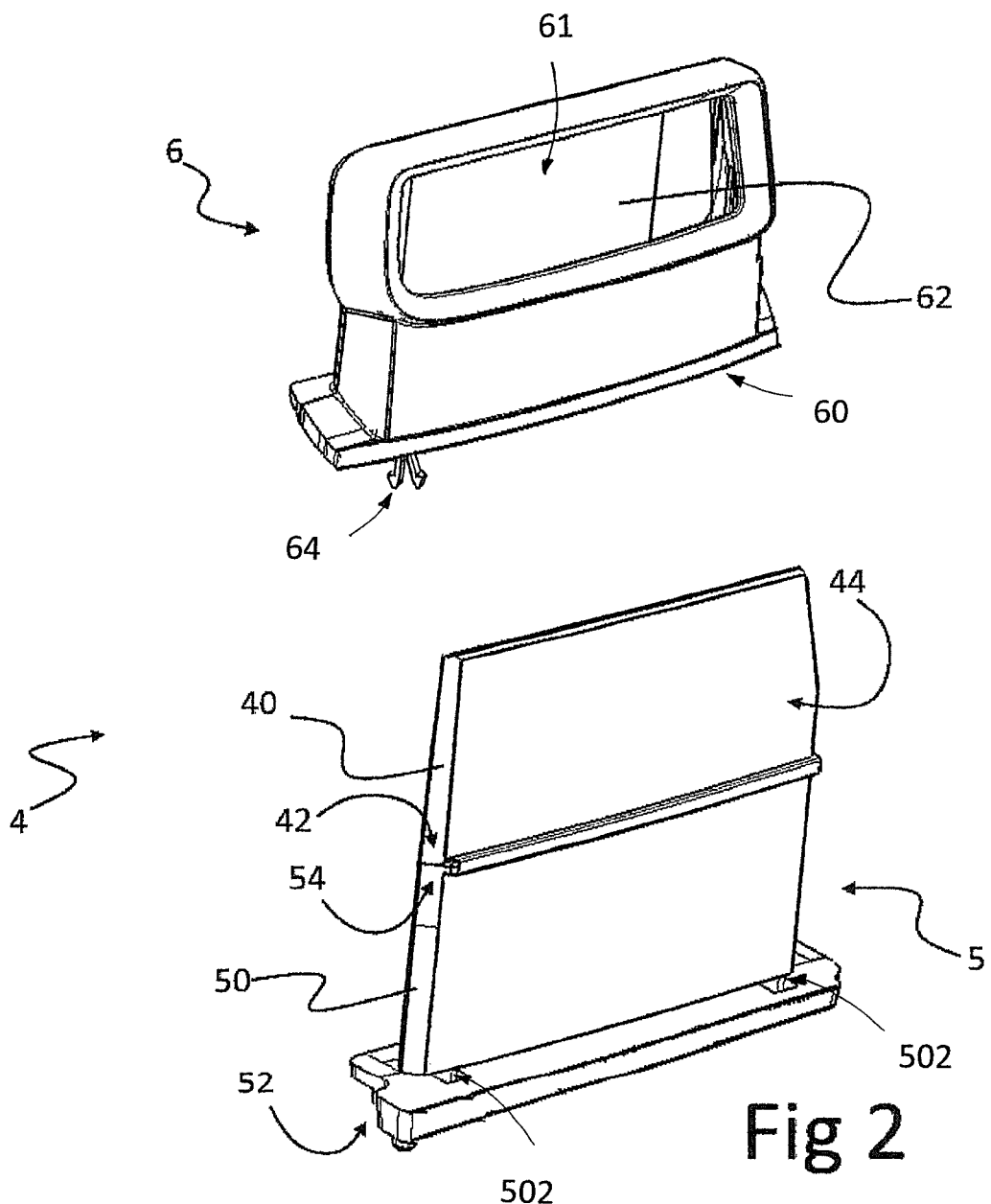
FIG. 2 shows an exploded perspective view of a light guide according to the present disclosure.

FIG. 2 shows an exploded perspective view of an embodiment of the light guide 4, according to the present disclosure. FIG. 2 shows how the light guide 4 could be made as one piece, wherein the diffuser body 40 and the extension 5 are joined together to form a single component. The figure shows the optical coupling between the diffuser inlet 42 of the diffuser body 40 and the coupling portion 54 of the extension 5.

As shown in FIG. 2, the dimensions of the extension 5 may be substantially similar to those of the diffuser body 40 of the light guide 4, thus permitting the upper end of the light emission portion 44 to be moved farther away by twice the distance from the light inlet portion of the light guide 4, in particular from the light collector 52 of the extension 5. The figure also shows one possible embodiment of a frame 6, adapted to be disposed around the diffuser body 40 of the light guide 4. In the illustrated embodiment, the frame 6 includes a reflecting portion 62.

FIG. 2 also shows a releasable fastener 64 in the form of a snap-action element. This Figure shows the guide body 50 with a flat portion in which fastening elements 502 are provided in the form of through-holes. The releasable fasteners 64, in the form of snap-action elements, are configured to be inserted into the through-holes FIG. 2 also shows the window 61, through which the surface of the light emission portion 44, may be visible to an observer. The figure also shows the reflecting portion 62 facing towards such window 61, it being substantially parallel thereto. FIG. 2 also shows the position of the aperture 60, which is configured to receive the diffuser body 40 of the light guide 4 into the internal area of the frame 6.

In some embodiments, the lamp assembly 2 of the present disclosure includes at least one light guide 4 according to the present disclosure. The light guide 4 of the present disclosure is particularly suitable for use in a lamp assembly 2 for an automobile. For example, the lamp assembly 2 may be a rear lamp, such as a brake light or a rear turn signal.

Figure 3:
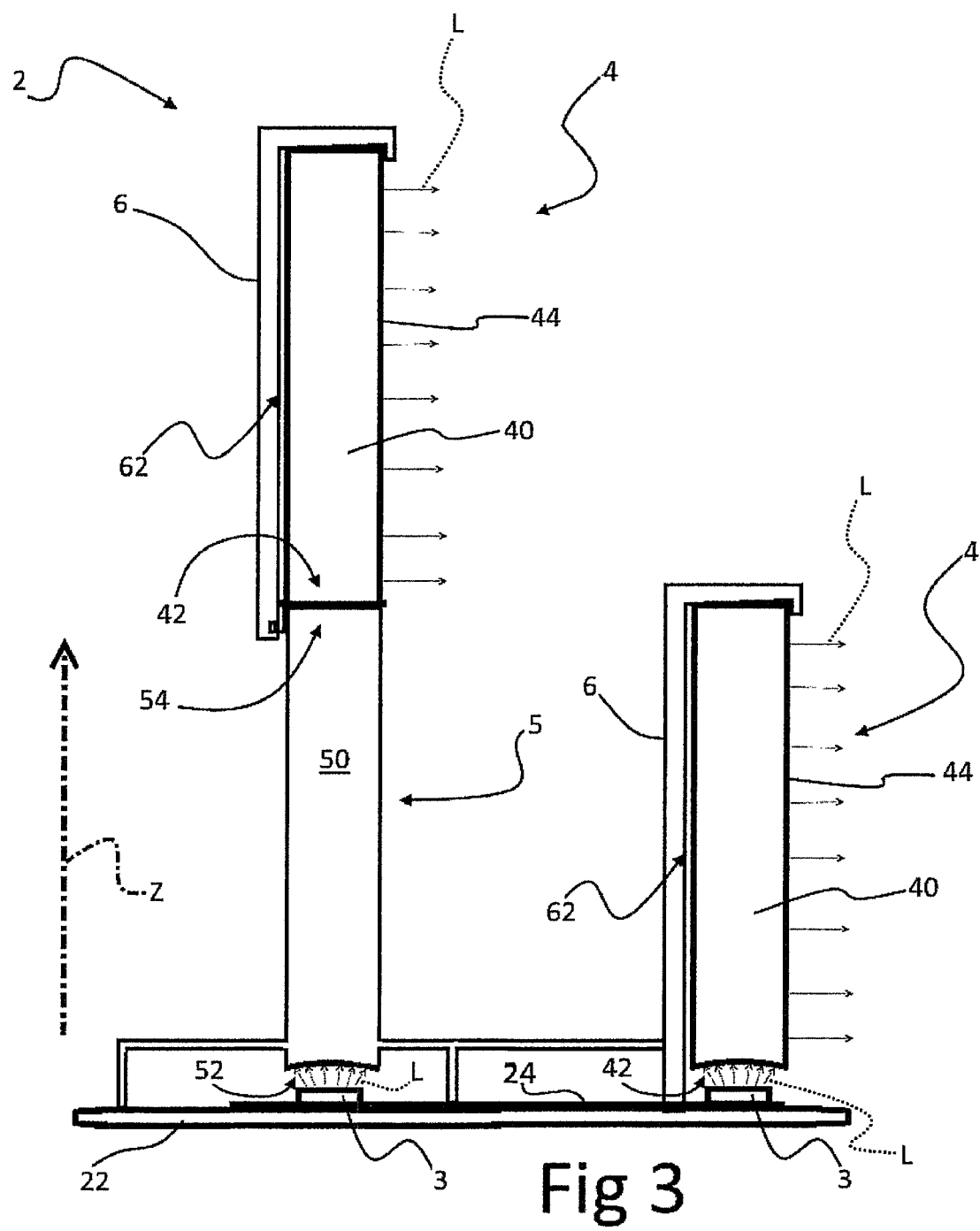
FIG. 3 shows a sectional view, relative to a lateral vertical plane, of a lamp assembly for a motor vehicle, according to the present disclosure.

In some embodiments, and as shown in FIG. 3, the lamp assembly 2 includes at least one supporting structure 22. The light sources 3 may be held by the supporting structure 22. Such light sources 3 are adapted to implement the functions of the lamp assembly 2.

For the purposes of the present description, the term "functions" refers to the emission of light of a suitable type-dependent color, with photometric specifications dictated by one or more law requirements, such as, for example, brake lights, parking lights, direction indicators, reverse light, etc. For example, the lamp assembly 2 may be configured to illuminate various ones of the light sources 3 with a color and other characteristics (e.g. intensity, flashing speed, etc.) to implement the brake light signal and/or the rear turn signal function.

The supporting structure 22 may include fastening elements (not shown), to secure the lamp assembly 2 in a housing formed in the body of the automobile.

Figure 4:
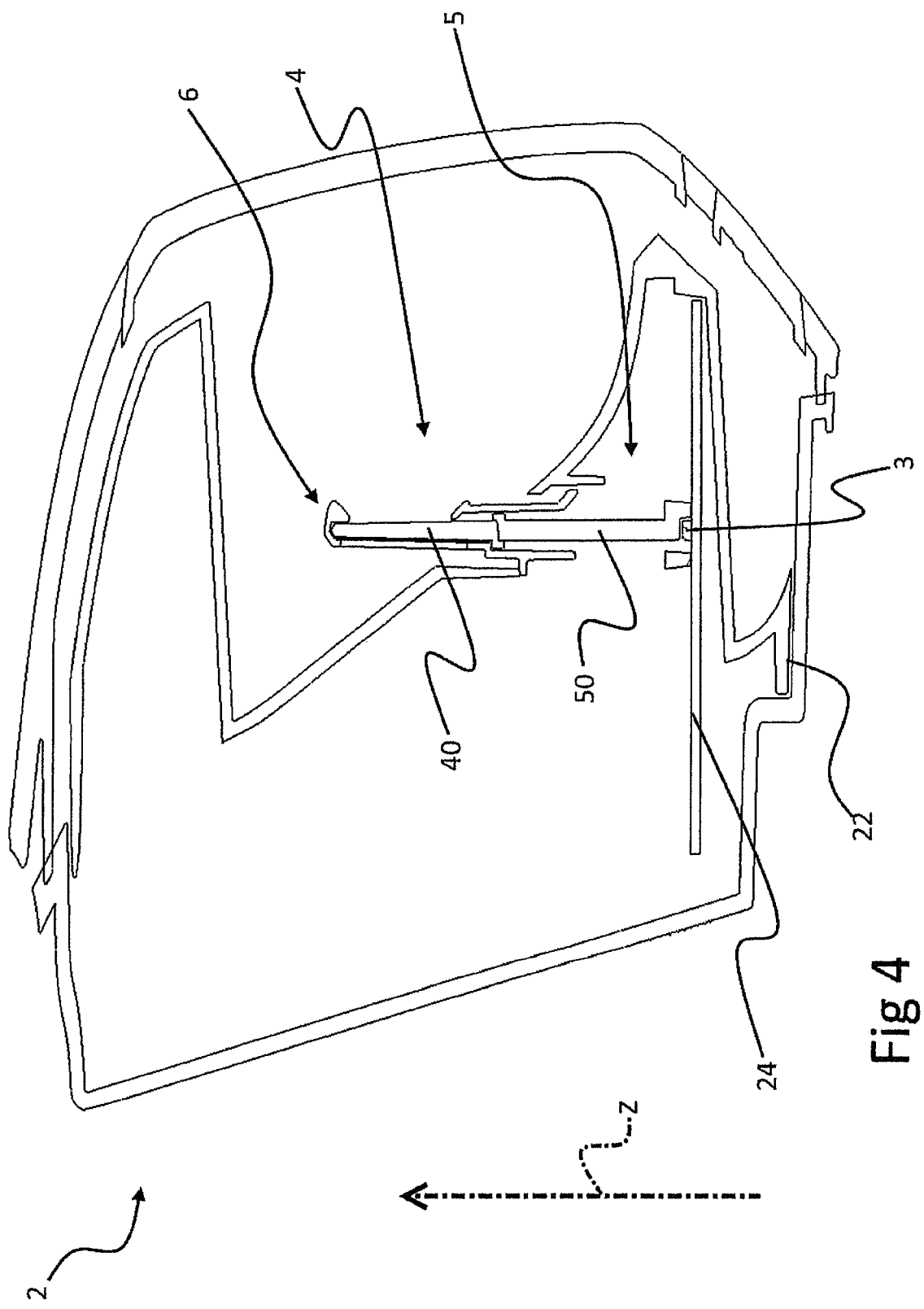
FIG. 4 shows a sectional view, relative to a lateral vertical plane, of a lamp assembly including a light guide, according to the present disclosure.

FIG. 4 shows a sectional view relative to a lateral vertical plane of a lamp assembly 2 including a light guide 4, according to the present disclosure. This figure shows how the diffuser body 40 of the light guide 4 can be placed in a higher position, relative to a vertical axis "Z", above a PCB 24 holding the light guide 4. The extension 5, and particularly the guide body 50, supports the diffuser body 40 of the light guide 4 a distance above the PCB 24. The PCB 24, which carries the light sources 3, is disposed on a supporting structure 22 of the lamp assembly 2. The light guide 4 also includes a frame 6, which defines a surface through which the light can exit and become visible to an observer. The remaining construction details of the lamp assembly 2 illustrated in FIG. 4 are merely examples, and may vary according to the characteristics of the lamp assembly 2 itself, e.g. according to the functions implemented therein and/or application details, such as design requirements of a particular automobile.

In some embodiments, the lamp assembly 2 includes a plurality of light guides 4. In such embodiments, at least one of the light guides 4 may include an extension 5 adapted to space the corresponding diffuser body 40 of the light guide 4 a distance apart from to the supporting structure 22 or a PCB 24. In particular, the disclosure provides for moving the diffuser body 40 farther away from the light sources 3 with respect to a vertical axis "Z". This arrangement allows the light emission portions 44 of the bodies 40 to be positioned at two different heights relative to a reference plane. This arrangement also enables a three-dimensional effect to be created, with the light emission portions 44 of different ones of the light guides 4 positioned at two or more different heights in space.

FIG. 3 shows a sectional view of two light guides 4 coupled together for installation in an automotive lamp assembly 2. As shown in FIG. 3, one light guide 4 includes an extension 5, while the other light guide 4 lacks the extension 5. Thus, it is possible to have two light emission portions 44 arranged at different heights along a vertical axis "Z". The conformation of the diffuser body 40 of each light guide 4 is substantially similar, and both light guides 4 comprise a respective frame 6 incorporating the reflecting portion 62.

Figure 5:
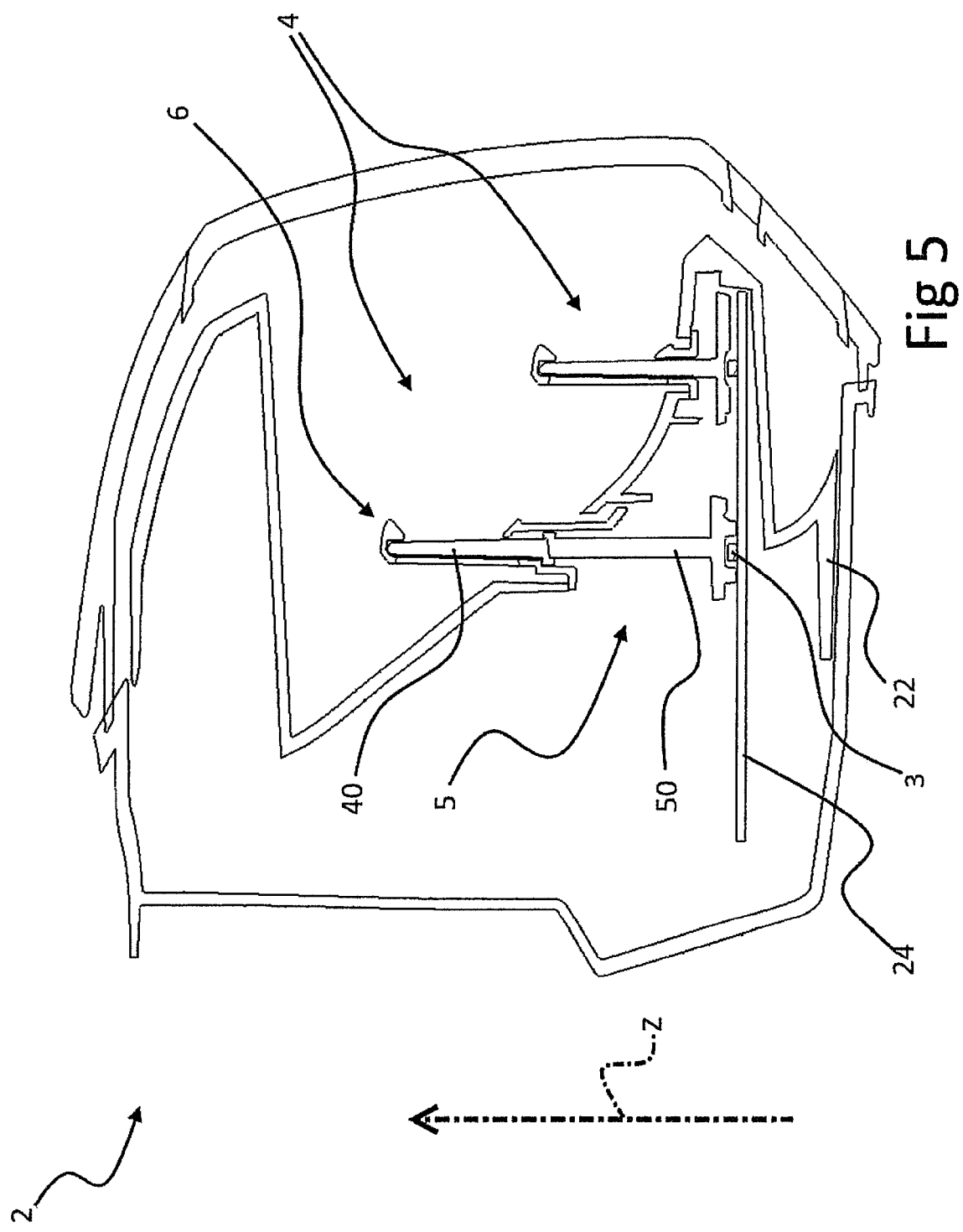
FIG. 5 shows a sectional view, relative to a lateral vertical plane, of a lamp assembly that includes a light guide with an extension and a light guide without an extension, according to the present disclosure.

FIG. 5 shows a sectional view, relative to a lateral vertical plane, of a lamp assembly 2 that includes two light guides 4. As shown in FIG. 5, one light guide 4 includes an extension 5, while the other light guide 4 lacks the extension 5. This figure shows how a particular visual effect of the lamp assembly 2 can be obtained because the bodies 40 of the light guides 4 are positioned at different heights relative to the vertical axis "Z", in addition to being located in different positions relative to an axis perpendicular to the vertical axis "Z".

In some embodiments, the lamp assembly 2 includes two or more light guides 4, each including an extension 5. In such embodiments, at least two of the extensions 5 may have different lengths along an a dimension orthogonal to the supporting structure 22, e.g. different lengths relative to the vertical axis "Z". Such a configuration permits positioning the light emission portions 44 of the diffuser body 40 at different heights relative to a reference plane, so that the lamp assembly 2 may create a three-dimensional effect using two or more light guides 4 with their light emission portions 44 positioned at different distances and heights in space.

In some embodiments, the light guides 4 of the present may compensate for losses caused by the diffuser body 40, because the diffuser body 40 can be positioned farther away from the light sources 3. The light guides 4 of the present disclosure can be used in a range of ways for different implementation solutions of a lamp assembly 2. For example, they may be used solely for aesthetic purposes.

The light guide 4 of the present disclosure may maximize the emission of light rays through the light emission portion 44, making it possible to simplify the construction of a light guide 4 with reduced losses, thus reducing the cost and/or complexity to assemble the light guide 4. The light guide 4 of the present disclosure may allow for the lamp assembly 2 to be made at a reduced cost, since it allows implementing functions in a motor vehicle lamp assembly 2, which may have shapes dictated by stylistic and aesthetic specifications, without requiring compliance with stringent technical constraints. The present disclosure may enable a lamp assembly 2 with a smaller number of light sources 3 than may otherwise be needed to uniformly illuminate a light emission portion 44, even a relatively large one, which may be distant from the light sources 3.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A light guide for a motor vehicle lamp assembly, comprising:
    a diffuser body made of a material with a first light diffusion property and including a diffuser inlet and a light emission portion, the diffuser body configured to conduct light rays by total internal reflection from the diffuser inlet to exit the diffuser body at the light emission portion so as to be visible to an observer; and an extension including a light collector configured to collect rays emitted by at least one light source, a coupling portion, and a guide body extending between the light collector and the coupling portion;

wherein the extension is made of material having a second light diffusion property that is substantially lower than the first light diffusion property of the diffuser body, and the extension is configured to conduct the light rays therethrough from the light collector to the coupling portion by total internal reflection;

wherein the light guide is coupled with at least one supporting structure to which at least one light source is connected;

wherein the extension and the diffuser body are aligned along a vertical axis perpendicular to the at least one supporting structure; and wherein the coupling portion is optically coupled to the diffuser inlet of the diffuser body for transmitting the light rays from the extension into the diffuser body.

2. The light guide according to claim 1, wherein the diffuser body is made of Poly(methyl methacrylate) (PMMA).

3. The light guide according to claim 1, wherein the extension is made of Poly(methyl methacrylate) (PMMA).

4. The light guide according to claim 1, wherein the diffuser body and the extension have a one-piece construction.

5. The light guide according to claim 1, wherein the diffuser body and the extension are formed together in a single production process.

6. The light guide according to claim 5, wherein the single production process includes injection molding.

7. The light guide according to claim 1, wherein the diffuser body further includes an other portion, other than the light emission portion, the other portion configured for at least one of diffusing or reflecting light rays incident thereupon.

8. The light guide according to claim 1, wherein the diffuser body further defines a shape configured to convey the light rays towards the light emission portion.

9. The light guide according to claim 1, further comprising a reflecting portion coupled to a face of the diffuser body opposite to the light emission portion, the reflecting portion adapted to reflect the light rays incident thereon and to direct the light rays towards the light emission portion.

10. The light guide according to claim 1, further comprising a frame surrounding the diffuser body, the frame leaving visible only at least a part of the light emission portion.

11. A light guide for a motor vehicle lamp assembly, comprising:
a diffuser body made of a material with a first light diffusion property and including a diffuser inlet and a light emission portion, the diffuser body configured to conduct light rays by total internal reflection from the diffuser inlet to exit the diffuser body at the light emission portion so as to be visible to an observer;
an extension including a light collector configured to collect rays emitted by at least one light source, a coupling portion, and a guide body extending between the light collector and the coupling portion; and
a frame surrounding the diffuser body, the frame leaving visible only at least a part of the light emission portion;
wherein the extension is made of material having a second light diffusion property that is substantially lower than the first light diffusion property of the diffuser body, and the extension is configured to conduct the light rays therethrough from the light collector to the coupling portion by total internal reflection;
wherein the coupling portion is optically coupled to the diffuser inlet of the diffuser body for transmitting the light rays from the extension into the diffuser body; and
wherein the frame comprises a releasable fastener configured to removably fasten the frame to the guide body of the light guide.

12. A lamp assembly for a motor vehicle, comprising:
a supporting structure holding one or more light sources; and
a light guide including:
a diffuser body made of a material with a first light diffusion property and including a diffuser inlet and a light emission portion, the diffuser body configured to conduct light rays by total internal reflection from the diffuser inlet to exit the diffuser body at the light emission portion so as to be visible to an observer; and
an extension including a light collector configured to collect rays emitted by the one or more light sources, a coupling portion, and a guide body extending between the light collector and the coupling portion;
wherein the extension is made of material having a second light diffusion property that is substantially lower than the first light diffusion property of the diffuser body, and the extension is configured to conduct the light rays therethrough from the light collector to the coupling portion by total internal reflection; and
wherein the coupling portion is optically coupled to the diffuser inlet of the diffuser body for transmitting the light rays from the extension into the diffuser body.

13. The lamp assembly for a motor vehicle according to claim 12, wherein the light guide is one of a plurality of light guides within the lamp assembly.

14. The lamp assembly for a motor vehicle according to claim 12, wherein the extension is configured to space the diffuser body of the light guide apart from the supporting structure.

15. The lamp assembly for a motor vehicle according to claim 12, wherein the light guide is one a plurality of light guides within the lamp assembly; and
wherein at least two of the plurality of light guides include extensions having different lengths along a dimension orthogonal to the supporting structure.

16. The lamp assembly for a motor vehicle according to claim 12, wherein the diffuser body is made of Poly(methyl methacrylate) (PMMA).

17. The lamp assembly for a motor vehicle according to claim 12, wherein the extension is made of Poly(methyl methacrylate) (PMMA).

18. The lamp assembly for a motor vehicle according to claim 12, wherein the diffuser body and the extension have a one-piece construction.

19. The lamp assembly for a motor vehicle according to claim 12, further comprising a reflecting portion coupled to a face of the diffuser body opposite to the light emission portion, the reflecting portion adapted to reflect the light rays incident thereon and to direct the light rays towards the light emission portion.

20. The lamp assembly for a motor vehicle according to claim 12, further comprising a frame surrounding the diffuser body, the frame leaving visible only at least a part of the light emission portion.

21. The light guide according to claim 1, wherein said at least one supporting structure is a printed circuit board.

22. The light guide according to claim 1, further comprising a second light guide having a second light emission portion arranged at a lower height, relative to a vertical axis, then the diffuser inlet of the light guide; and wherein said second light guide includes a frame having a reflecting portion.

\* \* \* \* \*